United States Patent [19]

Spedden et al.

[11] 3,834,760

[45] Sept. 10, 1974

[54] IN-SITU GENERATION OF ACID FOR IN-SITU LEACHING OF COPPER

[75] Inventors: Henry Rush Spedden; Emil Edward Maloue, both of Salt Lake City, Utah

[73] Assignee: Kennecott Copper Corporation, New York, N.Y.

[22] Filed: July 18, 1973

[21] Appl. No.: 380,245

[52] U.S. Cl..................... 299/5, 75/101 R, 166/280
[51] Int. Cl......................... E21b 43/28, E21c 41/14
[58] Field of Search ..................... 299/4, 5; 166/280

[56] References Cited
UNITED STATES PATENTS

| | | | |
|---|---|---|---|
| 3,639,003 | 2/1972 | Spedden et al. | 299/5 |
| 3,728,430 | 4/1973 | Clitheroe et al. | 299/5 |

*Primary Examiner*—Ernest R. Purser
*Attorney, Agent, or Firm*—Mallinckrodt & Mallinckrodt

[57] ABSTRACT

In-situ leaching of underground, copper-bearing ore deposits or waste dumps containing copper sulfide minerals is accomplished by introducing a hydraulic fluid containing particulate pyrite into the underground ore deposit or waste dumps under sufficient pressure to fracture the formation and to deposit the pyrite particles contained in the fluid in the fractures as a propping agent. An aqueous leach liquid and oxygen is then injected into the formation. The oxygen injected into the formation reacts with the pyrite propping agent in the presence of the aqueous leach liquid to rapidly produce ferric sulfate and sulfuric acid, which rapidly dissolves the copper sulfide minerals. The dissolution of the copper sulfide is accelerated by the in-situ generation of heat due to the oxygen reacting with the particulate pyrite, as well as by galvanic action set up at points of contact between the particulate pyrite and the metal sulfides in the underground ore deposit or waste dump.

6 Claims, No Drawings

IN-SITU GENERATION OF ACID FOR IN-SITU LEACHING OF COPPER

BACKGROUND OF THE INVENTION

Field: This invention relates to the leaching of copper sulfide values from formations of materials containing same, especially underground ore deposits and mine waste dumps and particularly those having a consolidated, substantially impervious character.

State of the Art: In place leaching has long been practiced as a method of recovering metallic values, especially copper, from underground deposits or formations of metal-bearing materials and from waste dumps built up at mines. Such leaching of copper sulfide minerals is normally accomplished by pumping acidified water to the top of the underground formation or waste dump and letting the water percolate down through the interstices of the material making up the mineralized formation or the waste dump. The pregnant leach solution is collected and treated to recover the metal values therefrom. Such processes are often severely hampered by the impervious nature of the formation, either naturally occurring or due to a build-up of precipitated iron salts in the interstices.

Hydraulic fracturing techniques have been proposed to increase the permeability of both underground formations and mine waste dump formations (see Canadian Pat. No. 880,708). It has also been proposed to use sand of a suitable mesh size as a propping agent in hydraulic fracturing techniques (see U.S. Pat. No. 3,063,499). Such techniques improve the permeability of the formation being treated. However, when a leach solution is percolated through the formation, attack on the insoluble copper-bearing minerals occurs in a limited area adjacent to the advancing front of leach liquid. Further, the leach liquid continuously decreases in its reagent strength as it percolates through the formation.

An in-situ method of leaching an underground ore deposit is shown in U.S. Pat. No. 3,640,579, wherein an underground nuclear detonation creates an area of broken ore. An aqueous leach liquid is pumped into the area along with oxygen. In those instances wherein a substantial amount of pyrite is contained in the ore which is to be leached, the oxygen reacts with the pyrite to form sulfuric acid and ferric sulfate. Unfortunately, underground deposits of copper usually contain insufficient amounts of pyrite to generate sufficient sulfuric acid and ferric sulfate necessary to leach the copper values from the deposits.

SUMMARY OF THE INVENTION

In accordance with the present invention, in-situ leaching of copper-bearing formations, such as underground ore deposits or waste dumps built up at mines, is carried out by injecting a hydraulic fluid containing particulate iron pyrite into the formation under sufficient pressure to hydraulically fracture the formation and deposit, in the fractures, particles of the pyrite contained in the hydraulic fluid. Contrary to what would be expected by considering the friability and generally low strength characteristics of pyrite, it has been found that the particulate pyrite makes an excellent propping agent in the hydraulic fracturing step of this invention. Following the hydraulic fracturing, an aqueous leach liquid and air or oxygen are simultaneously injected into the fractured formation.

Oxygen, in the presence of the aqueous leach liquid, oxidizes the pyrite particles which were deposited in the hydraulic fracturing of the formation to form sulfuric acid, $H_2SO_4$, and ferrous sulfate, $FeSO_4$ both of which dissolve in the acidified aqueous solution. The ferrous sulfate and a portion of the sulfuric acid further react in the presence of oxygen to produce ferric sulfate, $Fe_2(SO_4)_3$, which also dissolves in the acidified aqueous liquid. The resulting ferric sulfate and sulfuric acid solution is a very effective reagent for dissolving both oxide and sulfide copper minerals, and, thus, leaches copper values from the formation. The pregnant leach solution is withdrawn from the formation and the copper values recovered therefrom.

The in-situ oxidation of the pyrite in the formation generates a substantial quantity of heat, which has a synergistic effect in the leaching of copper from the formation. In addition, the contact occurring between the pyrite particles and the metal sulfides in the formation sets up a galvanic action, which further accelerates the dissolution of the copper values. When particulate pyrite is introduced hydraulically, the generation of sulfuric acid and ferric sulfate occurs continuously and substantially uniformly throughout the fractured formation, thereby providing a leach solution of substantially uniform strength that is operative throughout the fractured formation.

DETAILED DESCRIPTION OF BEST MODE CONTEMPLATED

The best mode presently contemplated of carrying out the invention involves the use of strategically placed injection wells driven into and/or bordering an underground area containing solid mineral values to be recovered, the depth and particular placement of such wells being dependent upon the nature of the formation concerned. The invention also involves the use of recovery wells, through which a leach solution pregnant with the values is withdrawn.

The method of the invention is especially useful as applied to porphyry copper deposits and to mine waste dumps often associated therewith. In carrying out the method with respect to either a deposit or a waste dump, one or more injection wells and recovery wells are drilled into the formation or the dump as deemed appropriate under the circumstances.

After the injection well or wells are drilled, they are preferably cased in the instance of an ore body, and the casing cemented to the naturally leached capping or gossan zone overlying the ore body. The casing of each well is perforated in the zone to be treated.

Fracturing of the ore body or waste dump can be accomplished by the method disclosed in our co-pending application Ser. No. 287,658, filed Sept. 11, 1972, the entire contents of which are incorporated herein by reference. Other methods of hydraulical fracturing are well known to those skilled in the art and can be used in practicing this invention. Several of such methods are shown in U.S. Pat. Nos. 2,645,291; 2,772,737; 2,876,839; 3,063,499; 3,108,636; and 3,640,579. The injection of a particulate propping agent into the fractures created by the fracturing step is well known in the art and described in the above mentioned patents.

It is essential in carrying out the hydraulic fracturing aspect of the process, to deposit particulate iron pyrite as the propping agent in the fractures created during the fracturing step. The pyrite should have a mesh size of between about 20 and about 40 U.S. sieve, and is injected into the formation to be fractured along with the hydraulic fluid. Propping agents normally used in hydraulic fracturing are hard and non-friable. Round sand is commonly used as a propping agent, and it was quite unexpectedly found that iron pyrite, which is more friable and much softer than sand, would function as an excellent propping agent in the present process.

Following the fracturing operation, the aqueous leach liquid and air or oxygen are injected simultaneously into the fractured formation. Such leach liquid percolates through the fractured formation and is withdrawn from one or more recovery wells. The aqueous leach liquid can be plain water, or it can be a dilute, acidified, aqueous solution of ferric or ferrous sulfate.

The oxygen or air injected into the formation simultaneously with the leach liquid reacts with the pyrite in the formation to produce sulfuric acid and ferrous sulfate. The ferrous sulfate reacts with a portion of the sulfuric acid to produce ferric sulfate.

Attack on insoluble copper minerals in the formation being treated by the resulting leach solution takes place substantially continuously and uniformly throughout the formation, rather than in a limited area defined by an advancing front of leach solution, as is the case wherein a solution containing an initial amount of ferric sulfate and sulfuric acid is percolated through the formation. The present process thus insures a fresh and continuous supply of active leach solution substantially uniformly throughout the formation when the pyrite is substantially uniformly disseminated, as it is when injected by hydraulic fracturing techniques. In addition, the in-situ oxidation of pyrite generates a substantial quantity of heat, which has a synergistic effect on the leaching of insoluble copper from the formation. Moreover, the pyrite particles and metal sulfides in the presence of the leach solution apparently set up a galvanic action, which further accelerates the dissolution of the copper values.

The copper values are advantageously recovered from the leach solution withdrawn from the formation by employing conventional cementation techniques.

Whereas this invention is here described with particular reference to the procedures constituting the best mode presently contemplated of carrying it out in actual practice, it should be understood that various changes may be made without departing from the inventive concepts defined by the following claims.

What we claim is:

1. A method of recovering copper values from copper-bearing formations, comprising: (a) injecting a hydraulic fluid containing particulate pyrite into such a formation, under sufficient pressure to hydraulically fracture said formation and deposit said particulate pyrite in said fractures as a propping agent; (b) introducing an aqueous leach liquid into said formation; (c) injecting air or oxygen into said formation containing said aqueous leach liquid, whereby the pyrite deposited in said formation in step (a) is oxidized to form, in-situ, sulfuric acid and ferrous sulfate, with the latter being oxidized to form, in situ, ferric sulfate; (d) dissolving said sulfuric acid and ferric sulfate in said aqueous leach liquid, in-situ; (e) utilizing the resulting solution from step (d) to leach copper from said copper-bearing formation; and (f) recovering the copper-bearing leach solution.

2. A method as claimed in claim 1, wherein the copper-bearing formation is an underground ore deposit.

3. A method as claimed in claim 1, wherein the copper-bearing formation is a mine waste dump.

4. A method as claimed in claim 1, wherein the hydraulic fluid is water.

5. A method as claimed in claim 1, wherein the leach liquid introduced into said formation in step (b) comprises an aqueous solution of ferric sulfate and sulfuric acid, and wherein the leaching power of said solution is increased by the in-situ production and dissolution of sulfuric acid and ferric sulfate.

6. A method as claimed in claim 1, wherein the leach liquid introduced into the formation in step (b) is essentially water.

* * * * *

PO-1050
(5/69)

UNITED STATES PATENT OFFICE
CERTIFICATE OF CORRECTION

Patent No. 3,834,760              Dated September 10, 1974

Inventor(s) Henry Rush Spedden, Emil Edward Malouf

It is certified that error appears in the above-identified patent and that said Letters Patent are hereby corrected as shown below:

Under the Heading "Inventors:" the name

"Maloue" should be -- Malouf --.

Signed and sealed this 19th day of November 1974.

(SEAL)
Attest:

McCOY M. GIBSON JR.                C. MARSHALL DANN
Attesting Officer                  Commissioner of Patents